United States Patent
Gran et al.

(10) Patent No.: US 11,148,149 B2
(45) Date of Patent: Oct. 19, 2021

(54) HYDRATED LIME WITH REDUCED RESISTIVITY AND METHOD OF MANUFACTURE

(71) Applicant: Mississippi Lime Company, St. Louis, MO (US)

(72) Inventors: Martin L. Gran, Chesterfield, MO (US); Randy Griffard, St. Mary, MO (US); William S. Allebach, Ste. Genevieve, MO (US); Paul J. Ramer, Ste. Genevieve, MO (US)

(73) Assignee: Mississippi Lime Company, St. Louis, MO (US)

( * ) Notice: Subject to any disclaimer, the term of this patent is extended or adjusted under 35 U.S.C. 154(b) by 336 days.

(21) Appl. No.: 16/235,885

(22) Filed: Dec. 28, 2018

(65) Prior Publication Data
US 2019/0202708 A1    Jul. 4, 2019

Related U.S. Application Data

(60) Provisional application No. 62/612,269, filed on Dec. 29, 2017.

(51) Int. Cl.
*B02C 23/38*    (2006.01)
*C01F 11/02*    (2006.01)
(Continued)

(52) U.S. Cl.
CPC ............ *B02C 23/38* (2013.01); *B01D 53/508* (2013.01); *B01D 53/81* (2013.01); *B01J 20/041* (2013.01);
(Continued)

(58) Field of Classification Search
CPC .......... B02C 23/38; B02C 23/06; B02C 23/18
(Continued)

(56) References Cited

U.S. PATENT DOCUMENTS 309,328 A    12/1884 Adams
671,621 A    4/1901 Dodge
(Continued)

FOREIGN PATENT DOCUMENTS

BE    2016/5471    * 6/2016
GB    1394330    5/1975
(Continued)

OTHER PUBLICATIONS

Nolan, Paul S. and Brinker, Michael R., "Hydrated Lime for Control of Acid Gas Emissions from Coal-Fired Power Plants" (12 pages).
(Continued)

*Primary Examiner* — Shelley M Self
*Assistant Examiner* — Smith Oberto Bapthelus
(74) *Attorney, Agent, or Firm* — Lewis Rice LLC (57) ABSTRACT

Systems and methods for generation of lime hydrate compounds and particularly highly reactive hydrated lime (HRH) with a reduced resistivity through the inclusion of a sodium compound generally in the slaking water used in generating the lime hydrate or HRH. The compound may then be used in systems which include a Electrostatic Precipitator (ESP) for $SO_2$ mitigation without many of the associated problems in ESP performance.

23 Claims, 2 Drawing Sheets

(51) Int. Cl.
  *B01D 53/81* (2006.01)
  *B01J 20/04* (2006.01)
  *B01J 20/28* (2006.01)
  *B01J 20/30* (2006.01)
  *B01D 53/50* (2006.01)
  *B02C 23/06* (2006.01)
  *B02C 23/18* (2006.01)

(52) U.S. Cl.
  CPC ....... *B01J 20/043* (2013.01); *B01J 20/28004* (2013.01); *B01J 20/28011* (2013.01); *B01J 20/28016* (2013.01); *B01J 20/28059* (2013.01); *B01J 20/3085* (2013.01); *B02C 23/06* (2013.01); *B02C 23/18* (2013.01); *C01F 11/02* (2013.01); *B01D 2251/404* (2013.01); *B01D 2251/604* (2013.01); *B01D 2257/302* (2013.01); *C01P 2004/51* (2013.01); *C01P 2004/61* (2013.01); *C01P 2004/62* (2013.01); *C01P 2006/12* (2013.01); *C01P 2006/90* (2013.01)

(58) Field of Classification Search
  USPC .......................................................... 241/21
  See application file for complete search history.

(56) References Cited

U.S. PATENT DOCUMENTS

| | | | |
|---|---|---|---|
| 1,613,341 A | | 1/1927 | Carson |
| 1,679,149 A | | 7/1928 | Berg |
| 1,954,211 A | | 4/1934 | Kuntz |
| 2,453,637 A | * | 11/1948 | Leonard ................ C04B 22/062 |
| | | | 106/800 |
| 2,894,820 A | | 7/1959 | Rikard et al. |
| 3,366,450 A | | 1/1968 | Waldeck |
| 3,839,551 A | | 10/1974 | Dozsa et al. |
| 3,929,417 A | | 12/1975 | Rosa et al. |
| 4,330,514 A | | 5/1982 | Nagai et al. |
| 4,636,379 A | | 1/1987 | Bestek et al. |
| 5,173,279 A | | 12/1992 | Dumont et al. |
| 5,223,239 A | | 6/1993 | Moran et al. |
| 5,277,837 A | | 1/1994 | Dumont et al. |
| 5,306,475 A | | 4/1994 | Fichtel et al. |
| 5,332,436 A | | 7/1994 | Walker, Jr. et al. |
| 5,705,141 A | | 1/1998 | Dumont et al. |
| 5,935,299 A | | 8/1999 | Park et al. |
| 6,200,543 B1 | | 3/2001 | Allebach et al. |
| 6,322,769 B1 | | 11/2001 | Langelin et al. |
| 6,926,879 B2 | * | 8/2005 | Huege ..................... C04B 2/04 |
| | | | 241/24.1 |
| 7,338,649 B2 | | 3/2008 | Huege et al. |
| 7,744,678 B2 † | | 6/2010 | Laudet |
| 9,517,471 B1 | * | 12/2016 | Griffard ................ B01D 53/508 |
| 2002/0046632 A1 | | 4/2002 | Wallin et al. |
| 2007/0082978 A1 | | 4/2007 | Suzuki et al. |
| 2009/0229462 A1 | | 9/2009 | Laudet et al. |
| 2009/0246117 A1 | | 10/2009 | Tilquin et al. |
| 2009/0246524 A1 | | 10/2009 | Ohmi et al. |
| 2011/0150755 A1 | | 6/2011 | Euston |
| 2012/0134903 A1 | | 5/2012 | Brasseur et al. |
| 2013/0156664 A1 | | 6/2013 | Jankura et al. |
| 2016/0151760 A1 | * | 6/2016 | Butz ..................... B01D 53/40 |
| | | | 95/58 |
| 2019/0022621 A1 † | | 1/2019 | Foo |
| 2019/0127273 A1 † | | 5/2019 | Lorgouilloux |

FOREIGN PATENT DOCUMENTS

| | | |
|---|---|---|
| JP | 2007031212 A | 2/2007 |
| WO | 2015119880 A1 † | 8/2015 |

OTHER PUBLICATIONS

Gale, Thomas K., Cannon, Jared W., Nolan, Paul S., Brinker, Michael R., Brasseur, Alain and Laudet, Alain, "Hydrated Lime for SO3 Removal," Paper #128 (16 pages).

Srivastava, R.K., Miller, C.A., Erickson, C. and Jambhekar, R., "Emissions of Sulfur Trioxide From Coal-Fired Power Plants," Technical Publication, Riley Power Inc, a Babcock Power Inc. company, www.babbockpower.com, presented at POWER-GEN International 2002, Dec. 10-12, 2002, Orlando, Florida (20 pages).

"A Guidebook to Particle Size Analysis," Horiba Scientific, pp. 1-29 (17 pages).

Peterson, Joseph R., Maller, Gordon, Burnette, Andrew and Rhudy, Richard G., "Pilot-Scal Evaluation of Sorbent Injection to Remove SO3 and HCL," Managing Hazardous Air Pollutants State of the Art, Electric Power Research Institute TR-101890, printed Nov. 16, 2009, pp. 520-538 (22 pages).

Oates, Lime and Limestone: Chemistry and Technology, Production and Use, 2007, Chapter 17, pp. 192-198 (8 pages).

Bauer, Wolf G., "The Lime Plant Operator," Hydration in Theory and Practice, Part VIII—Putty Production, Pit and Quarry, Jul. 1947, vol. 40, No. 1, pp. 168-170 (3 pages).

Rodney Foo, et al., "ESP Compatible Calcium Sorbent for SO2 Capture at Great River Energy's Stanton Station", 16 pages, Aug. 16-19, 2016, Baltimore, MD, Paper # 49, presented at the Power Plant Pollutant Control and Carbon Management "MEGA" Symposium.†

\* cited by examiner
† cited by third party

FIG 2

HYDRATED LIME WITH REDUCED RESISTIVITY AND METHOD OF MANUFACTURE

CROSS REFERENCE TO RELATED APPLICATION(S)

This application claims the benefit of U.S. Provisional Patent Application Ser. No. 62/612,269, filed Dec. 29, 2017, the entire disclosure of which is herein incorporated by reference.

BACKGROUND OF THE INVENTION

1. Field of the Invention

The invention relates generally to air pollution control processes aimed at controlling acid gases that are emitted from industrial, utility, incineration, or metallurgical process. Specifically, the invention concerns the mitigation of sulfur dioxide ($SO_2$) using a high reactivity calcium hydroxide (hydrated lime) with a reduced resistivity which is suitable for use in a flue gas system utilizing an Electrostatic Precipitator (ESP).

2. Description of the Related Art

Many efforts have been made to develop materials for improved capability for cleaning or "scrubbing" flue gas or combustion exhaust. Most of the interest in such scrubbing of flue gas is to eliminate particular compositions, specifically acid gases, that contribute to particularly detrimental known environmental effects, such as acid rain.

Flue gases are generally very complex chemical mixtures which comprise a number of different compositions in different percentages depending on the material being combusted, the type of combustion being performed, impurities present in the combustion process, and specifics of the flue design. However, the release of certain chemicals into the atmosphere which commonly appear in flue gases is undesirable, and therefore the release of those specific components is generally regulated by governments and controlled by those who perform the combustion.

Some of the chemicals that are subject to regulation are certain acid gases. A large number of acid gases are desired to be, and are, under controlled emission standards in the United States and other countries. This includes compounds such as, but not limited to, hydrogen chloride (HCl), sulfur dioxide ($SO_2$) and sulfur trioxide ($SO_3$). Sulfur trioxide can evidence itself as condensable particulate in the form of sulfuric acid ($H_2SO_4$). Condensable particulate can also be a regulated emission.

Flue gas exhaust mitigation is generally performed by devices called "scrubbers". Scrubbers introduce chemical compounds into the flue gas. The compounds then react with the undesirable compounds which are intended to be removed. Through these reactions, the undesirable compounds are either captured and disposed of, or turned into a less harmful compound prior to their exhaust, or both. In addition to controlling the emissions for environmental reasons, it is desirable for many combustion plant operators to remove acid gases from the plant's flue gas to prevent the acid gases from forming powerful corroding compounds which can damage flues and other equipment.

These acid gases can arise from a number of different combustion materials, but are fairly common in fossil fuel combustion (such as oil or coal) due to sulfur being present as a common contaminant in the raw fuel. Most fossil fuels contain some quantity of sulfur. During combustion, sulfur in the fossil fuel can oxidize to form sulfur oxides. A majority of these oxides forms sulfur dioxide ($SO_2$), but a small amount of sulfur trioxide ($SO_3$) can also be formed. Particularly in coal combustion, where the chemical properties of the coal are often highly dependent on where it is mined, the ability to mitigate the amount of sulfur oxides in flue gas is highly desirable as it allows for lower quality raw coal (which may be less expensive to produce and more abundant) to be burned sufficiently cleanly to lessen environmental impact and impact on machinery.

$SO_2$ is a gas that contributes to acid rain and regional haze. Since the 1970s, clean air regulations have been designed to reduce emissions of $SO_2$ from industrial processes at great benefit to the environment and human health. For large emitters, the use of wet and dry scrubbing has led to the reduction of $SO_2$. Smaller emitters, however, seek out less costly capital investment to control $SO_2$ emissions in order to remain operating and produce electricity or steam.

While the process for controlling them is relatively simple, mitigation of undesirable compounds can be very difficult. Because of the required throughput of a power generation facility, flue gases often move through the flue very fast and, thus, are present in the area of scrubbers for only a short period of time. Further, many scrubbing materials often present their own problems. Specifically, having too much of the scrubbing material could cause problems with the plant's operation from the scrubber material clogging other components or building up on moving parts.

The presence of acid gases in flue gas dictates operational decisions and increases operating costs with many tradeoffs. Minimization of $SO_2$ conversion to $SO_3$ may warrant the extra expense of low conversion catalyst in Selective Catalyst Reduction (SCR) equipment. Fear of forming sticky ammonium bisulfate (ABS) particles on Air Preheater (APH) internals will affect operation of the SCR in order to contain ammonia slip. The need to operate safely above dew point in the APH also increases heat rate and resulting energy costs. Greater air flow due to a high heat rate translates to additional power required to run the fans. Further, ash release from baghouse bags can be less efficient if the acid gases are untreated. Finally, units equipped with wet Flue Gas Desulfurization (FGD) will remove HCl, but the chlorides in the wet system can lead to corrosion issues or additional processing in water treatment.

Flue gas treatment has become a focus of electric utilities and industrial operations due to increasingly tighter air quality standards. As companies seek to comply with air quality regulations using cost-effective fuels, the need arises for effective flue gas treatment options. Alkali species based on alkali or alkaline earth metals are common sorbents used to neutralize the acid components of the flue gas. The most common of these alkalis are sodium, calcium, or magnesium-based. A common method of introduction of the sorbents into the gas stream is to use Dry Sorbent Injections (DSI). The sorbents are prepared as a fine or coarse powder and transported and stored at the use site. DSI systems pneumatically convey powdered sorbents to form a fine powder dispersion in the duct.

One proposed material for use in scrubbing of acid gases is increased use of hydrated lime. It has been established that hydrated lime can provide a desirable reaction to act as a mitigation agent. Hydrated lime systems are proven successful in many full-scale operations. These systems operate continuously to provide utility companies with a dependable, cost-effective means of acid gas control.

To provide effective acid gas control, hydrated lime compositions have specifically focused on having high surface area based on the theories of Stephen Brunauer, Paul Hugh Emmett, and Edward Teller (commonly called BET theory and discussed in S. Brunauer, P. H. Emmett and E. Teller, *J. Am. Chem. Soc.*, 1938, 60, 309, the entire disclosure of which is herein incorporated by reference). This methodology particularly focuses on the available surface area of a solid for absorbing gases—recognizing that a surface, in such circumstances, can be increased by the presence of pores and related structures.

The reaction of hydrated lime with acid gas (such as $SO_2$) is generally assumed to follow the diffusion mechanism. The acid gas removal is the diffusion of $SO_2$ from the bulk gas to the sorbent particles. High surface area does not itself warrant a prediction in improved removals of acid gases. Specifically, high pore volume of large pores is generally believed to be required to minimize the pore plugging effect and, therefore, BET surface area has been determined to be a reasonable proxy for effectiveness of lime hydrates in removal of acid gases.

Because of this, commercially available products are currently focused on obtaining lime hydrate with particularly high BET surface areas and this is believed to be necessary to provide for effective absorption. It is generally believed that the BET surface area really needs to be above 20 $m^2/g$ to be effective, and in many recent hydrated lime compositions the BET surface area is above 30 $m^2/g$ to attempt to continue to improve efficiency.

Two examples of such compositions with increased BET surface areas are described in U.S. Utility Pat. Nos. 5,492,685 and 7,744,678, the entire disclosures of which are herein incorporated by reference. These sorbents offer good conveying characteristics and good dispersion in the flue gas, which is necessary for high removal rates. Use of a higher quality, high reactivity source of hydrated lime allows for better stoichiometric ratios than previous attempts that utilized lower quality hydrated lime originally targeted for other industries such as wastewater treatment, construction, asphalt, etc. Hydrated lime is versatile in terms of injection location and removal as hydrated lime can serve to remove both $SO_2$ and $SO_3$ at a variety of locations in the flue gas duct.

Much of the efficiency of DSI equipment is dictated by the ability of the injection system to have the sorbent contact the acidic components of the flue gas. Flue gas pathways are not homogeneous in nature, as structural components of the flue, wall effects, and combustion processes provide a flue gas stream that can be stratified horizontally or vertically. It is the job of the DSI system to put the sorbent where the acid gas travels. Sorbent which does not enter the zones where acid is concentrated is free to react with other components of the flue gas or remain unreacted until removed in particulate collection.

Many current utilities that require acid gas mitigation utilize an Electrostatic Precipitator (ESP) for particulate collection. This equipment uses electrostatic charges to drive ash in the flue gas against charged metal plates. Ash collects on the plates and then is removed (rapping) at regular intervals to meet the requirements of environmental discharge. ESP sizing will generally determine the amount of ash that can be removed. Excessive amounts of ash beyond the ESPs' capacity will lead to problems with opacity limits in the discharge. These limits are commonly regulated at typically about 20% maximum opacity. Some units may also be regulated for particulate emissions. Too much ash in the discharge will also lead to increased particulate emissions.

Unfortunately, many existing ESPs were sized based upon the expected ash only from the coal being used to fire the boiler at the time of construction. The ESPs were designed and installed prior to DSI, so any added particulate as the result of DSI prior to the ESP was not factored into ESP capacity and use of DSI can reduce the effectiveness of the ESP potentially to the point where opacity limits are not obtained.

The primary parameter in ESP performance is the particulate resistivity of the particulates it is to remove. Particulate resistivity is a measure of how well the particulate, when deposited on the ESP electrodes, conducts the electrical charge to ground. Ideally, the charge needs to be sufficient to hold the dust particulate to the collecting plate but not hold too much of a charge so the collecting plates can be cleaned with normal rapping. The optimum value for resistivity is generally considered to be in the range of $10^8$ to $10^{11}$ ohm-cm. These particles will adhere, yet are easily removed by standard rapping. If the resistivity is in the range $10^{12}$ to $10^{14}$ ohm-cm the dust is considered to be high resistivity which can result in degraded ESP performance. It has previously been shown that traditional hydrated lime particulates have a negative effect on the performance of an ESP as traditional hydrated lime has too high of a resistivity and therefore hydrated lime which is unreacted with $SO_2$ can degrade ESP performance by building up on ESP plates. As hydrated lime is generally added in excess of expected $SO_2$ concentration in order to improve $SO_2$ removal, the use of hydrated lime in $SO_2$ removal prior to an ESP has been problematic, particularly in systems with smaller or older ESP systems that were sized not taking into account the presence of lime particulates.

Additionally, units with undersized ESPs that have a relatively high amount of $SO_3$ present in the flue gas can encounter additional operational problems due to the addition of hydrated lime sorbent injection to attempt to reduce $SO_2$. In some configurations, calcium reagents may increase the resistivity of the ash that collects on the ESP plates. If the resistivity is increased too much, the ESP plates will not capture ash from the flue gas, resulting in increased opacity and particulate content of the flue gas exiting the ESP. The extra particulate may also not be captured in a downstream scrubber, leading to emission problems with the unit.

The resistivity problem can occur with even a small amount of lime hydrate being added if the ESP is marginally sized for the ash loading. If the acid gas content of the flue gas is relatively high, the amount of sorbent required to capture acid gas prior to ESP may be so high as to cause resistivity issues with an ESP even of moderate size. Because of the resistivity issues with ash, hydrated lime sorbents have previously been unusable on units having high $SO_3$ content and/or an undersized ESP for the expected ash loading.

Given the short residence time for a sorbent in a flue gas treatment system using an ESP for dust collection, efficient in-flight capture of the $SO_2$ gas is also critical. This often overlooked property is a necessary requirement for efficient $SO_2$ removal. When the reaction time is limited, the external surface area can be more important than the internal surface area (as measured by the BET gas adsorption process.) The external surface area is an indication of the actual size of the hydrate particle as opposed to its available surface area. As the external or relative surface size increases the particle size decreases. In contrast to large particles that may have a high total surface area, it is the outer surface of ultrafine particles that hold most of the free reactants that are needed for the actual reaction. The smaller the individual particles often the more effective the removal when the residence time is limited.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

There are described herein, systems and methods for generation of lime hydrate compounds and particularly highly reactive hydrated lime (HRH) with a reduced resistivity through the inclusion of a sodium compound generally in the slaking water used in generating the lime hydrate or HRH. The compound may then be used in systems which include a Electrostatic Precipitator (ESP) for $SO_2$ mitigation without many of the associated problems in ESP performance. The HRH will commonly have a resistivity in the range of $10^8$ to $2\times10^{11}$ ohm-cm and will have a resistivity below $10^{12}$ ohm-cm.

There is also described herein, among other things, a method for manufacturing reduced resistivity lime hydrate, the method comprising: providing a particulate form of quicklime; slaking in a hydrator said quicklime with water including a sodium compound additive to form a damp hydrated lime; removing said damp hydrated lime from said hydrator; flash drying said damp hydrated lime to obtain a dried lime hydrate; and milling said dried lime hydrate to a particulate hydrated lime product.

In an embodiment of the method, the sodium compound is selected from the group consisting of: sodium carbonate, sodium hydroxide, sodium bicarbonate, trona, and combinations thereof.

In an embodiment of the method, the damp hydrated lime has a residual moisture of at least 5%.

In an embodiment of the method, the damp hydrated lime has a residual moisture of between 5% and 35%.

In an embodiment of the method, the damp hydrated lime has a residual moisture of between 10% and 25%.

In an embodiment of the method, the damp hydrated lime has a residual moisture of less than 5%.

In an embodiment of the method, the damp hydrated lime has a residual moisture of between 2% and 4%.

In an embodiment of the method, the sodium compound additive comprises between 0.5 to 8% wt of quicklime.

In an embodiment of the method, the sodium compound additive comprises between 3 to 4% wt of quicklime.

In an embodiment of the method, the sodium compound additive comprises about 3.5% wt of quicklime.

In an embodiment of the method, the sodium compound additive comprises between 0.4 to 12% wt of water.

In an embodiment of the method, the sodium compound additive comprises between 3 to 5% wt of water.

In an embodiment of the method, the sodium compound additive comprises about 4% wt of water.

In an embodiment of the method, the lime hydrate has a BET surface area of at least 18 $m^2/g$.

In an embodiment of the method, the lime hydrate has a BET surface area of at least 30 $m^2/g$.

In an embodiment of the method, the lime hydrate has a citric acid reactivity of less than 15 seconds.

In an embodiment of the method, the lime hydrate has a citric acid reactivity of less than 7 seconds.

In an embodiment of the method, the lime hydrate has a D10 of less than 8 microns.

In an embodiment of the method, the lime hydrate has a D50 of less than 4 microns.

In an embodiment of the method, the lime hydrate has a D10 of about 0.8 microns.

In an embodiment of the method, the lime hydrate has a D90 of about 5 microns.

In an embodiment of the method, the lime hydrate has a D90/D10 ratio of about 6.25.

In an embodiment of the method, the lime hydrate has a resistivity of less than $2\times10^{11}$ ohms-cm.

In an embodiment of the method, the lime hydrate has a resistivity of between $10^8$ and $10^{11}$ ohms-cm.

DETAILED DESCRIPTION OF THE PREFERRED EMBODIMENT(S)

Figure 1:
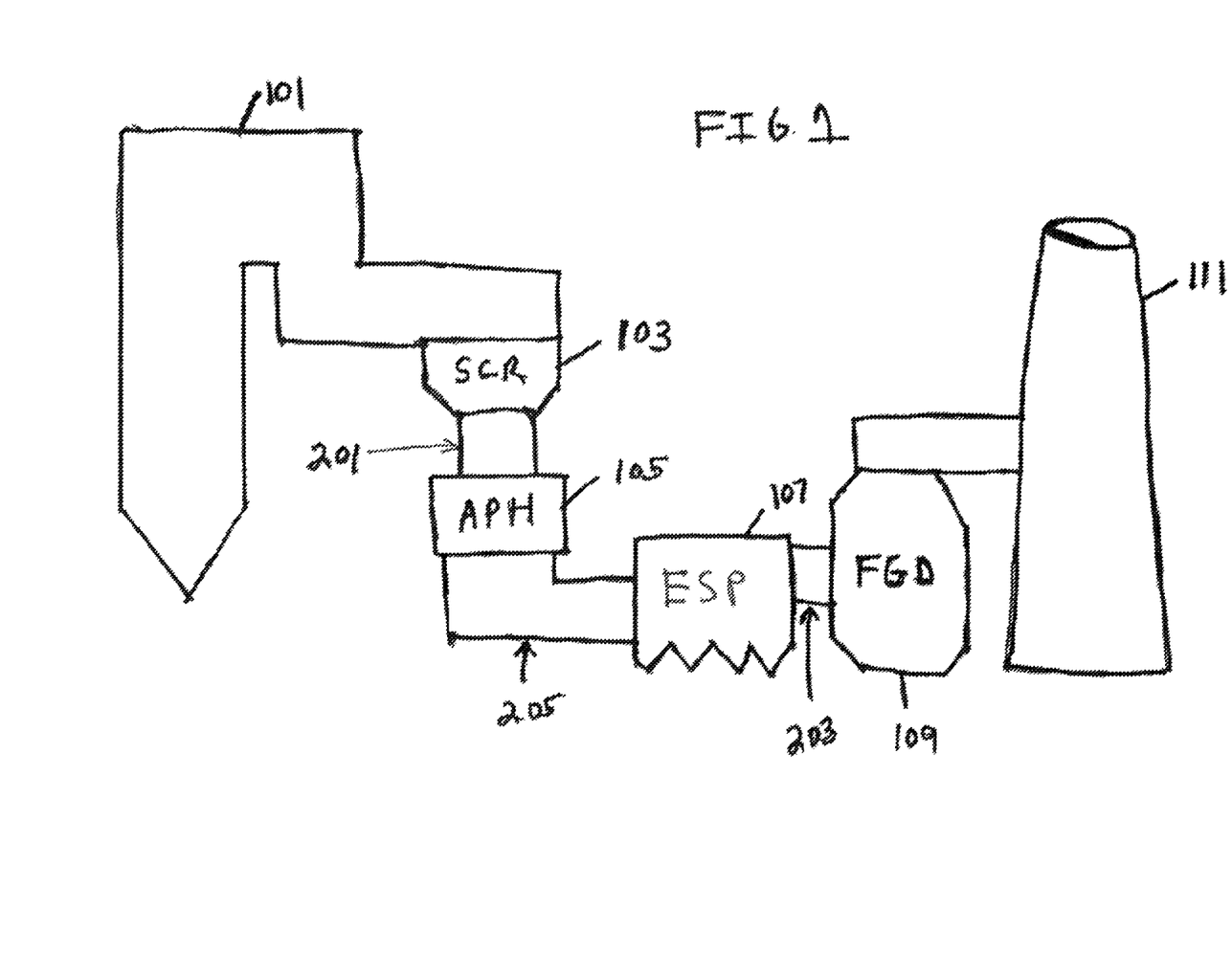
FIG. 1 provides a conceptual block diagram of an embodiment of a flue gas duct system as may be used in, for example, a coal fired power plant.

FIG. 1 shows a loose block diagram of an arrangement of a flue gas duct system such as can be used in a coal fired power plant which utilizes a particulate removal system in the form of an electrostatic precipitator (ESP). Generally, major components include the boiler (101), a Selected Catalytic Reduction (SCR) system for reducing $NO_x$ emissions (103), an Air Preheater (APH) (105), an Electrostatic Precipitator (ESP) (107), a Flue Gas Desulfurization (FGD) unit (109), and then the exhaust stack (111). Hydrated lime has typically been injected after the APH (105) and prior to the ESP (107) at point (205), or prior to the FGD (109) at point (203). The latter is contemplated, for example, in U.S. Utility patent application Ser. No. 10/315,837, the entire disclosure of which is herein incorporated by reference. The present disclosure, however, will primarily be concerned with injection of lime compounds at any point prior to the ESP (107) which includes point (205) and point (201). Further, this injection will typically be for control of $SO_2$, but this is by no means required and the injection can be for control of any component of the flue gas.

A highly reactive lime hydrate (HRH) can be manufactured in accordance with a number of processes, but is generally contemplated herein as material manufactured in accordance with, and/or having the properties discussed in, U.S. Utility patent application Ser. Nos. 14/180,128 and 14/289,278, the entire disclosures of both of which are herein incorporated by reference. HRH is notably different from other hydrated lime as it has an improved removal rate of acidic pollutants present in the flue gas where the sorbent is delivered and the rate of removal is generally substantially higher. The use of a high purity, highly reactive hydrated lime such as HRH will have faster neutralization of acidic species.

While it may be provided in a variety of forms, in an embodiment, the HRH is a dry solid free of excess moisture. The product used may be described by having citric acid reactivity of less than 15 seconds, preferentially less than 10 seconds, optimally less than 7 seconds. The product used may also be described by having available calcium hydroxide concentration of greater than 92% wt, preferentially greater than 94% wt, and optimally greater than 95% wt. The product used may also be described by having at least 90% of particles less than 10 microns, preferentially less than 8 microns. At least 50% of the particles are less than 4 microns, preferentially less than 3 microns. The product may also be described as having a BET surface area of at least 18 $m^2/g$, preferentially at least 19 $m^2/g$, 20 $m^2/g$, or 30 $m^2/g$.

HRH is generally used as part of a dry sorbent injection system into the off gas of an industrial plant, incinerator, or boiler that combusts sulfur and/or halogenated fuels. The DSI system for injecting HRH or other lime hydrates will generally comprise a storage silo, feed valve, and a means of conveyance of the product that could use pressurized gas or vacuum. The conveying gas/hydrate mixture is conveyed within a pipe and fed into the flue gas stream to be treated.

There can be one or multiple feed points into the flue gas as contemplated above. The hydrated lime can be injected at temperatures below 2400° F. for capture of $SO_2$. The hydrated lime can be injected at temps below 1100° F. for capture of $SO_3$ and/or halogenated acids.

The reactivity enhancement of HRH is beneficial especially when the end user can capitalize on the hydrated lime's ability to rapidly neutralize the acid gases in flight, i.e., prior to forming a bed upon bags of a fabric filter or plates of an ESP. HRH can also provide benefit where a user needs to achieve high level removal in a short time and does not have the luxury of a long duct run. This can be particularly valuable where there is co-injection with a mercury sorbent where $SO_3$ must be removed prior to the mercury sorbent, and in applications with a short residence time prior to a small ESP (e.g., where point (205) is part of a short duct).

It should be recognized that in many situations, such as those with short duct runs or others that require quick reaction with acid gases, one common way to improve acid gas removal is to increase the amount of sorbent, such as lime hydrate, that is injected. Having more hydrate than needed generally improves the reaction and increases acid gas removal. At the same time, excess hydrate is carried into later components, such as the ESP, where it can reduce the effectiveness of those later components.

Particulate resistivity is one property of a material that can impact the sizing and performance of an ESP for particulate collection. Traditional hydrated lime and lime compounds used for acid gas removal are known to have a relatively high particulate resistivity that at certain temperatures can exceed the range recommended as best for ESP performance ($10^8$ to $10^{11}$ ohm-cm). Because of this, adding too much hydrate prior to an ESP has previously resulted in degraded performance of the ESP.

Described herein is a hydrated lime material, and the method of making same, that preferably has both high reactivity and therefore qualifies as an HRH as contemplated above, and with a reduced particulate resistivity for use in flue gas treatment methods such as dry sorbent injection where an ESP is employed for particulate collection. By combining the properties of lower resistivity, surface area (BET analysis), and very small hydrate crystals, this represents a new type of hydrate specifically designed for DSI injection into a system equipped with an electrostatic precipitator (ESP). While this is the preferred lime hydrate discussed herein, it is recognized that even lower reactivity lime hydrates such as those that do not meet the criteria of being an HRH can also be used in the lime compounds as contemplated herein. Depending on the specific flue system, these resultant compounds may be sufficient to meet the needs of the specific ESP and flue system.

The preferred properties of an embodiment of an HRH compound (Lime Hydrate with the inclusion of sodium additive) of the present disclosure are shown in Table 1.

TABLE 1

| Surface Area (m2/g) | D10 (micron) | D50 (micron) | D90 (micron) | D90/D10 Ratio | Citric Reactivity (s) | Particulate Resistivity at 350 F. (ohms-cm) |
|---|---|---|---|---|---|---|
| Greater than 18 | About 0.8 | About 2 | About 5 | About 6.25 | Less than 10 | Less than $2 \times 10^{11}$ |

An HRH produced in accordance with U.S. Utility patent application Ser. No. 14/180,128 or 14/289,278 will typically have the desired characteristics, except it will typically have a greater than desired resistivity which resistivity can be lowered with the inclusion of a sodium compound. Lime hydrates having similar characteristics, or having lower reactivity when compared to an HRH, would also be expected to lack the desired resistivity but if they meet other criteria can utilize the inclusion of a sodium compound to reduce resistivity. In order to improve the resistivity, sodium is generally incorporated into the matrix of an HRH, other high reactivity hydrated lime product, or other hydrated lime compound to directly lower the resistivity of the hydrated lime and make it more favorable for use in applications with ESPs.

Depending on embodiment, a sodium compound such as, but not limited to, sodium carbonate ($Na_2CO_3$), sodium hydroxide (NaOH), sodium bicarbonate ($NaHCO_3$), and or trona $Na_2CO_3$—$NaHCO_3$-$2H_2O$ is added to a hydrated lime composition to lower the resistivity. In alternative embodiments, sodium metal may alternatively or additionally be added. Resistivity of the hydrated lime composition have been found to generally correlate with elemental sodium content of the sodium compound added and, therefore, the exact form in which the sodium is provided generally doesn't affect the resultant resistivity. Sodium carbonate (or soda ash) is considered to be a generally preferred source of sodium because of its combination of high sodium content, ready availability, price, ease of preparation and use, safety factors, and other related characteristics making it readily available and easy to use.

Sodium compounds, when added to lime hydrate, have been found to reduce resistivity without undue expense using addition rates in the range of about 0.5% to about 5% by weight, preferably around 3% of the total resultant hydrated lime composition. Generally the specific additive rate will depend on the nature of the selected compound and available elemental sodium. A lime hydrate compound will typically be formed by addition of sodium carbonate with about 0.5% to about 8% sodium carbonate by weight to initial quicklime during slaking. It is more preferred that the sodium carbonate be about 3% to about 4% by weight (more preferably about 3.5%) to the quicklime product. This is believed to provide sufficient resistivity to reduction while still being cost effective to produce.

While the sodium may be added to the final lime hydrate in an embodiment to produce the lime hydrate composition of the present disclosure, it has been found that the process location in which the additive is incorporated can have a significant effect on the final resistivity of the product and it is actually preferred to add the sodium compound during slaking. As contemplated above, the sodium compound amount may be selected based on the quicklime present. Alternatively, as the sodium compound is generally preferably added to the slaking water, the amount of sodium compound may be selected as a weight percentage to water with the sodium compound comprising about 0.4% to about 12% by weight to water, preferably about 3% to about 5% by weight to water, and more preferably about 4% by weight to water.

Lime hydrate has generally been manufactured according to a commonly known and utilized process. First, a lime feed of primarily calcium oxide (commonly known as quicklime) is continuously grinded using a pulverizing mill until a certain percentage of all the ground particles meet a desired size (e.g., 95% or smaller than 100 mesh). Second, the quicklime meeting the desired size requirements is then fed into a hydrator, where the calcium oxide reacts with water (also known as slaking), and then quickly dried to form calcium hydroxide in accordance with the following equation:

$$CaO + H_2O \rightarrow Ca(OH)_2$$

Finally, the resultant calcium hydroxide (also known as hydrated lime) is then milled and classified until it meets a desired level of fineness, surface area, and/or BET surface area.

Figure 2:
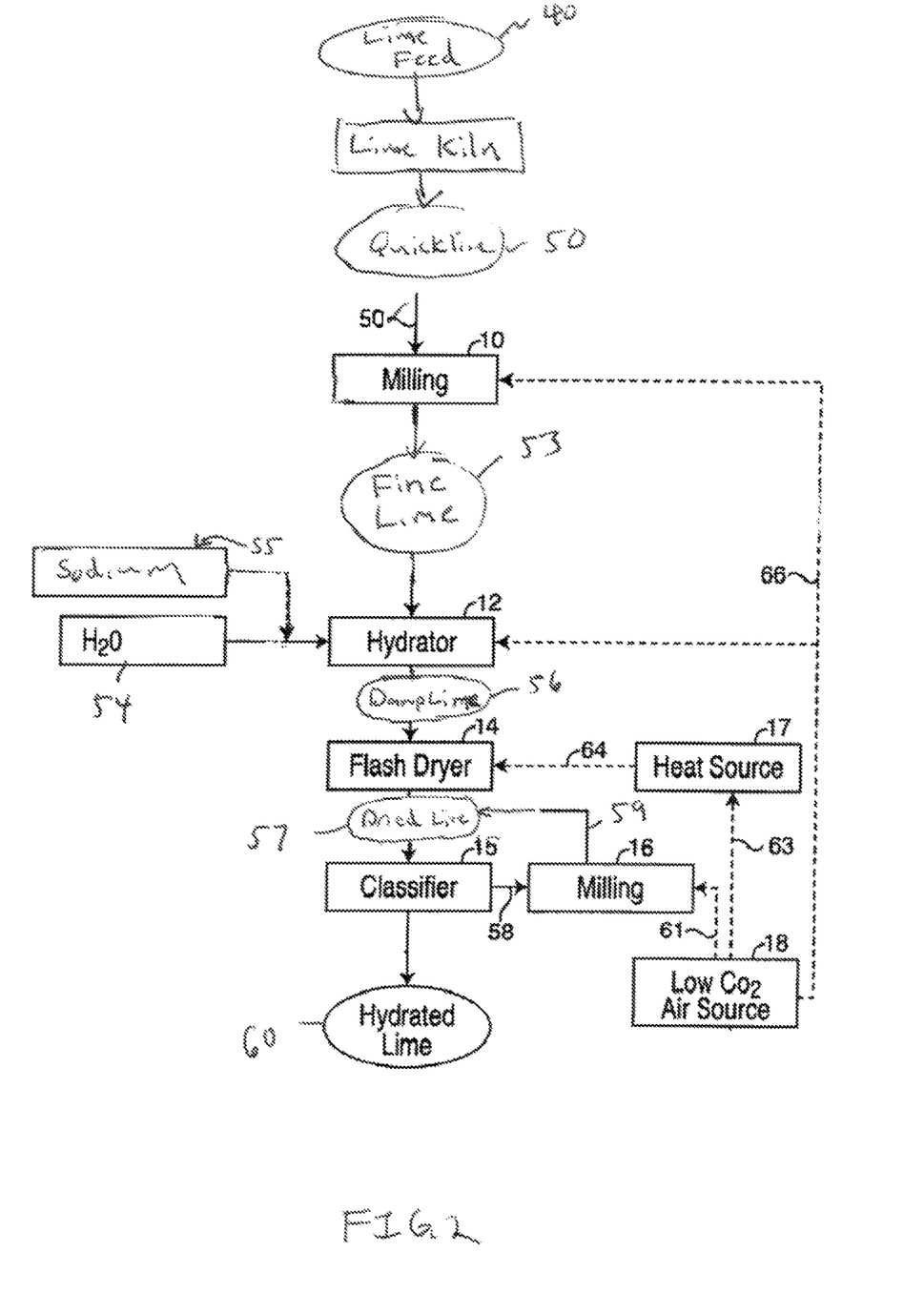
FIG. 2 depicts a block diagram of an embodiment of a method of manufacturing hydrated lime.

Turning now to FIG. 2, a general block diagram of the method of manufacturing hydrated lime including a sodium compound will be described in more detail in accordance with several embodiments. After a lime feed (40) has been heated in a lime kiln (41) to a temperature above 825 C, quicklime (50) is formed in accordance with the following formula:

$$CaCO_3(s) \rightarrow CaO(s) + CO_2(g)$$

The quicklime (50) is subjected to fine grinding or milling (10) to produce a fine lime (53). The fine lime (53) can be of varying sizes in different embodiments. Any grinding or milling is suitable, including, for example, fine grind cage mill, swing hammer mill, screen mill, etc. where the amount of milling produces the desired particle-size distribution. The fine lime (53) (and resultant steps) may also be produced and performed using the methodology of U.S. Utility patent application Ser. No. 15/596,911, the entire disclosure of which is herein incorporated by reference.

In an embodiment, the fine lime (53) will have a particle-size distribution of greater than about 80% minus 200 mesh. In another embodiment, it will be greater than 93.5% minus 200 mesh. It should also be noted that, although the prior description refers to particles passing through a mesh, this description and use of mesh merely refers to the common use of the term "mesh" as it relates to particle-size distribution. A mesh screen or sieve need not be used to measure or classify the particle-size. Instead, the air classification system is preferably used.

As quicklime is generally not stable and, when cooled, will spontaneously react with $CO_2$ from the air until, after enough time, it is completely converted back to calcium carbonate. All the milling and classification of the quicklime (50) should preferably be produced entirely in a closed-circuit system to prevent air slaking and recarbonation (I.e., CaO to $CaCO_3$) from occurring, although a closed-circuit system is by no means required. In some embodiments, additional measures are employed to prevent recarbonation. For example, conditioned low $CO_2$ air (18) can be injected (66) into these systems to replace any air being drawn in and around process equipment bearings and seals. This conditioned air (18) is also very useful if the quicklime needs to be pneumatically conveyed. The process for conditioning this air is discussed more fully below and is also described in U.S. Utility Pat. No. 6,200,543 (the entire disclosure of which is incorporated herein by reference).

As noted above, the fine lime (53) then undergoes a hydration or slaking process (12). The hydration process (12) generally comprises a hydrator (12), and in a preferred embodiment, the fine lime (53) is combined with an excess of water (54) which includes the sodium compound as contemplated previously and is rapidly mixed, which allows the calcium oxide to react with the water to form a wet or damp calcium hydroxide (hydrated lime) which will now also include the sodium additive. The water (54) for hydration is generally fed at a reasonably high temperature but low enough that the refined fine lime (53) is not overheated (burned). In this regard, the water feed (54) and hydrator (12) temperature should be maintained below the boiling point of water, and more preferably, at a temperature equal to or below 180° F. Utilizing an excess of water (i.e., more than necessary to react with the CaO but at a controlled percentage as known to those of ordinary skill in the art) also helps prevent overheating and burning and helps separate the individual particles. In any event, in one embodiment, the damp hydrated lime (56) that leaves the hydrator (12) has a residual moisture greater than 5%. Generally, the water level will be about 5-35% or about 10-25%. Alternatively, the residual moisture may be substantially lower and, in another embodiment, may be in the range of about 2% to about 4%. Residual moisture will generally be selected to ensure that the resultant hydrated lime composition meets the desired surface area range as contemplated in Table 1. As discussed above, the sodium compound (55) is preferably included in the water feed (54) that is utilized in the hydration process (12) but this is not required and it may be added to the quicklime prior to the hydration process (12) or after slaking is completed in alternative embodiments.

To make the sodium infused water feed, the sodium additive is generally mixed into water to prepare a mixture, suspension, solution, or other combination (57) of the sodium compound (55) and water (54). The combination (57) is then metered with a pump into the hydration water supply line on the suction side of the hydrator water supply pump. In this way, the sodium additive (55) is mixed completely into the water used for hydration (12) and delivered uniformly into the hydrator where it contacts the calcium oxide feed at the beginning of the hydration process. Without being limited to any particular theory of operation, it is believed that using this method results in the sodium being incorporated into the matrix of the hydrated lime particle during the hydration process.

Once the water (54) and sodium additive (55) addition is complete, excess water is removed from a wet hydrated lime to make a damp hydrated lime (56) but the material is not yet completely dried. To finalize drying, the damp calcium hydroxide (56) may be flash dried in a flash dryer (14) utilizing low $CO_2$ air source (18) which is heated by a heat source (17) and provided (64) to the flash dryer (14). Traditionally, after formation of a damp hydrate (56), the damp hydrate (56) will generally be flash dried quite quickly (less than 30 minutes) after the water was initially supplied, but this is by no means required.

After being dried in a flash dryer (14), the dried hydrated lime (57) is then classified (15) and milled (16). The dried hydrated lime (57) is first fed into a classifier (15). If it meets the desired properties (e.g., those discussed in Table 1 above, including purity reactivity, BET surface area, and particle size), dried hydrated lime (57) is utilized as the final hydrated lime product (60). Some of the dried hydrated lime (57), however, may not meet the desired properties. This non-final hydrated lime is then fed (58) into the mill (16) to be grinded, with the grinded hydrated lime being fed (59) back into the classifier (15) to determine if the material can be utilized as the final hydrated lime product (60). This process of milling (16) and classifying (15) can continue for as long as is necessary to meet target properties. If target properties cannot be met in a commercially reasonable time frame, the product will generally be discarded Again, in a preferred embodiment, the milling (16) and classification system (15) are conducted in a closed circuit system to prevent air carbonation from occurring. Conditioned air (61) (i.e., low CO2) can further be injected into the milling (16) and classification system (15) to replace any transient air being drawn into the process and prevent recarbonation.

The above process of manufacturing describes a process in which the drying (14), classifying (15), and milling (16) of the damp hydrated lime (56) are conducted independently. As would be understood by one of ordinary skill in the art, milling and classification system can be, and commonly are, integrated into one system. Similarly, an integrated milling and classification system can be further integrated into a dryer.

In the present method, the amount of excess of sodium/water compound provided in the hydrator appears to correlate with the reduction in lime hydrate particulate resistivity. Thus, adding a higher ratio of water/sodium compound to lime during hydration (which corresponds to a higher moisture content in the hydrator discharge) appears to result in more reduced resistivity product. Even a small amount of excess moisture left at the discharge of the hydrator had a beneficial impact in terms of lowering the particulate resistivity of the final product.

Even when the sodium is incorporated into a hydrate with <1% excess moisture there is still a resistivity benefit. Further, if an HRH with low (<1%) excess moisture was re-wetted with a water and sodium compound additive combination such as those discussed previously to achieve a 20% moisture content and the hydrate was then re-dried, the resistivity of the hydrate was further lowered compared to the resistivity of the originally prepared material regardless of if the hydrate had been originally slaked with a sodium water compound or only with water. Thus, if additional resistivity decreases are desired above what is produced in the initial production of lime hydrate, the compound may be rewetted with an additional sodium compound to decrease resistivity.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method friar manufacturing reduced resistivity lime hydrate, the method comprising:
   providing a particulate form of quicklime;
   slaking in a hydrator said quicklime with water including a sodium compound additive to form a damp hydrated lime;
   removing said damp hydrated lime from said hydrator;
   flash drying said damp hydrated lime to obtain a dried lime hydrate; and
   milling said dried lime hydrate to a particulate hydrated lime product;
   wherein said lime hydrate has a citric acid reactivity of less than 15 seconds.

2. The method of claim 1 wherein said sodium compound is selected from the group consisting of: sodium carbonate, sodium hydroxide, sodium bicarbonate, trona, and combinations thereof.

3. The method of claim 1 wherein said damp hydrated lime has a residual moisture of at least 5%.

4. The method of claim 3 wherein said damp hydrated lime has a residual moisture of between 5% and 35%.

5. The method of claim 3 wherein said damp hydrated lime has a residual moisture of between 10% and 25%.

6. The method of claim 1 wherein said damp hydrated lime has a residual moisture of less than 5%.

7. The method of claim 6 wherein said damp hydrated lime has a residual moisture of between 2% and 4%.

8. The method of claim 1 wherein said sodium compound additive comprises between 0.5 to 8% wt of quicklime.

9. The method of claim 8 wherein said sodium compound additive comprises between 3 to 4% wt of quicklime.

10. The method of claim 9 wherein said sodium compound additive comprises about 3.5% wt of quicklime.

11. The method of claim 1 wherein said sodium compound additive comprises between 0.4 to 12% wt of water.

12. The method of claim 11 wherein said sodium compound additive comprises between 3 to 5% wt of water.

13. The method of claim 11 wherein said lime hydrate has a D50 of less than 4 microns.

14. The method of claim 12 wherein said sodium compound additive comprises about 4% wt of water.

15. The method of claim 1 wherein said lime hydrate has a BET surface area of at least 18 $m^2/g$.

16. The method of claim 1 wherein said lime hydrate has a BET surface area of at least 30 $m^2/g$.

17. The method of claim 1 wherein said lime hydrate has a citric acid reactivity of less than 7 seconds.

18. The method of claim 1 wherein said lime hydrate has a D10 of less than 8 microns.

19. The method of claim 1 wherein said lime hydrate has a D10 of about 0.8 microns.

20. The method of claim 1 wherein said lime hydrate has a D90 of about 5 microns.

21. The method of claim 1 wherein said lime hydrate has a D90/10 ratio of about 6.25.

22. The method of claim 1 wherein said lime hydrate has a resistivity of less than $2\times10^{11}$ ohms-cm.

23. The method of claim 1 wherein said lime hydrate has a resistivity of between $10^8$ and $10^{11}$ ohms-cm.

\* \* \* \* \*